A. W. COATES.
HORSE HAY-RAKE.
No. 181,142. Patented Aug. 15, 1876.
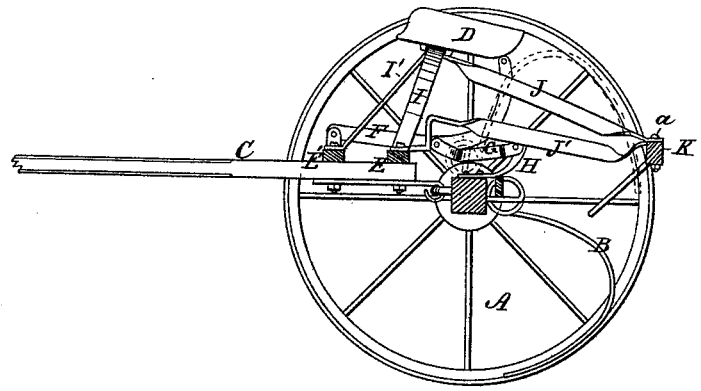
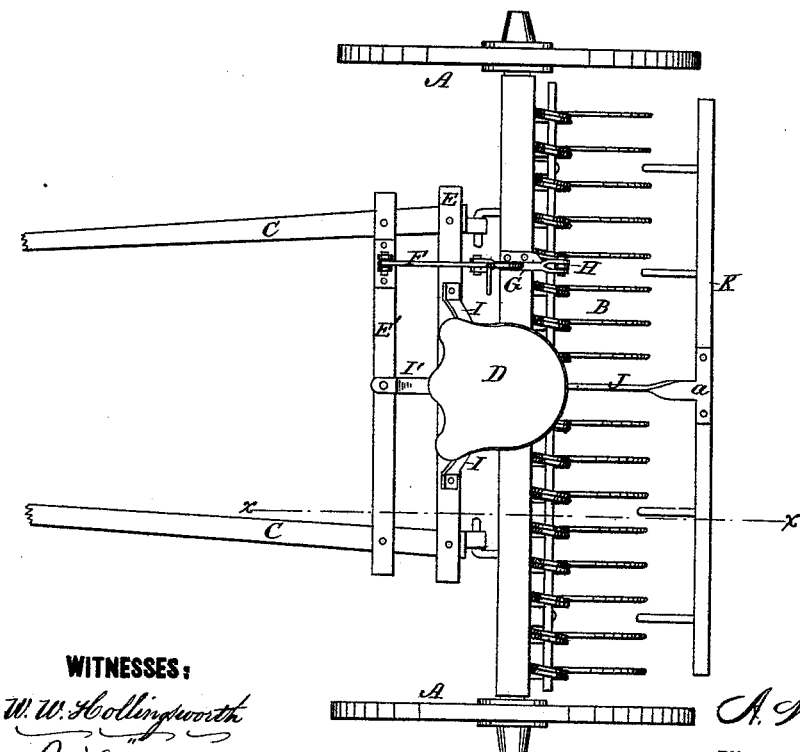

UNITED STATES PATENT OFFICE.

AMOS W. COATES, OF ALLIANCE, OHIO.

IMPROVEMENT IN HORSE HAY-RAKES.

Specification forming part of Letters Patent No. 181,142, dated August 15, 1876; application filed June 28, 1876.

*To all whom it may concern:*

Be it known that I, AMOS W. COATES, of Alliance, in the county of Stark and State of Ohio, have invented a new and Improved Horse Hay-Rake; and I do hereby declare that the following is a full, clear, and exact description of the same, reference being had to the accompanying drawing, forming part of this specification, in which—

Figure 1 is a vertical section through line x x, Fig. 2. Fig. 2 is a plan view.

My invention relates to certain improvements in horse hay-rakes; and it consists in a cheap, simple, practical, and durable means of attaching a clearer for cleaning the rake-teeth when elevated, the said clearer being held rigidly in an elevated position above the rake-teeth upon supporting-bars projecting rearward from the driver's seat, and forming a part of the support for the same, as hereinafter more fully described.

In the drawing, A represents the wheels; B, the rake attached to the main axle; C, the shafts, and D the driver's seat, of any ordinary hay-rake. E E' are two cross-bars connecting the shafts near the thill-couplings, and forming the support for the driver's seat. Upon one of the cross-bars E is pivoted the hand-lever F, which is connected, through rod or bar G, with an arm, H, upon the axle. This lever F, and its connecting mechanism, is located near the driver's seat, and is used for oscillating the axle and lifting the rake whenever it becomes filled with the accumulated hay.

The driver's seat is mounted upon a bent supporting-bar, I, located upon cross-bar E, and upon a bar, I', located on the cross-bar E', and extending rearwardly to the driver's seat, so as to brace the same. J is an iron bar rigidly attached to the bottom of the driver's seat, bent so as to be edgewise in vertical direction, and projecting to the rear, while J' is a second iron bar rigidly attached to the cross-bar E, and bent upwardly at right angles a distance sufficient to leave room for the lifting of the rake, and then bent to the rear horizontally, or nearly so, in edgewise position. Both these bars J J' terminate in a cross or T shaped end, a, which is securely bolted to the clearer-bar K, which bar is provided with the usual pendent teeth, which pass between the rake-teeth, and clear them when the rake is lifted. The bars J J' are bent edgewise in vertical direction to give them greater stiffness in supporting the clearer, and while they serve to brace the driver's seat in the rear, they also hold the clearer in an elevated position, and the rake and clearer are thus relieved of the wear produced by the friction of one against the other, when the said clearer is allowed to rest loosely upon the rake. Another advantage arising out of the elevated position of the clearer is, that it obviates the danger of being broken when the rake is passing over heavy windrows or large bunches or piles of hay.

Having thus described my invention, what I claim as new is—

In a horse hay-rake, the combination, with the driver's seat and the clearer K, of the rearwardly-projecting bars J J', bent edgewise, and terminating in a T-shaped end for attachment to said clearer, and fastened at their front ends, one to the driver's seat, and the other to the support for the driver's seat, so as to brace the said seat and hold the clearer in a rigid elevated position, substantially as described.

AMOS W. COATES.

Witnesses:
HERBERT B. FREER,
JOHN W. BARNABY.